United States Patent [19]

Hughes et al.

[11] 4,199,610

[45] Apr. 22, 1980

[54] NON-HYGROSCOPIC DRY INSTANT BEVERAGE MIXES

[75] Inventors: Donald L. Hughes, Cincinnati; Jack A. Doty, Greenhills; Charles B. Vinson, Forest Park, all of Ohio

[73] Assignee: The Procter & Gamble Company, Cincinnati, Ohio

[21] Appl. No.: 941,873

[22] Filed: Sep. 13, 1978

[51] Int. Cl.² ............................................. A23L 2/00
[52] U.S. Cl. .................................. 426/590; 426/473; 426/591
[58] Field of Search ............... 426/590, 591, 285, 262, 426/96, 103, 465, 598, 97, 658, 471, 473, 650; 127/29

[56] References Cited

U.S. PATENT DOCUMENTS

| | | | |
|---|---|---|---|
| 284,464 | 9/1883 | Michaelis | 426/103 |
| 541,255 | 6/1895 | Wichmann | 426/96 |
| 2,424,992 | 8/1947 | Lee | 426/650 |
| 3,930,053 | 12/1975 | Japikse, et al. | 426/590 |
| 3,966,994 | 6/1976 | Kennedy | 426/590 |
| 4,022,924 | 5/1977 | Mitchell et al. | 426/650 |
| 4,051,268 | 9/1977 | Shires, et al. | 426/590 |

FOREIGN PATENT DOCUMENTS 21535 of 1900 United Kingdom ................... 426/591

Primary Examiner—Richard V. Fisher
Assistant Examiner—Michael Goldman
Attorney, Agent, or Firm—Leonard Williamson; Rose Ann Dabek; Richard C. Witte

[57] ABSTRACT

In the preparation of a dry, stable, phosphoric acid acidulated beverage mix, heretofore, a phosphoric acid chemical stabilizer was required due to the notorious hygroscopicity of $H_3PO_4$, particularly in fructose sweetened systems. This invention eliminates the need for such stabilizers via the employment of pulverized crystalline sugar for improved structural stability, faster solubility and non-hygroscopicity of the dry beverage mix heretofore unknown in the art. The dry beverage mix of the present invention rapidly dissolves in aqueous solution which may be carbonated to form colas, root beers, sarsaparillas or any other beverage which contains phosphoric acid as a flavoring ingredient and acidulent. This dry beverage mix is made via vacuum drying a uniform slurry of the pulverized sugar, liquid flavorant and phosphoric acid acidulent.

16 Claims, No Drawings

NON-HYGROSCOPIC DRY INSTANT BEVERAGE MIXES

TECHNICAL FIELD

This invention relates to food products, and more particularly to aqueous carbonated beverages prepared by adding a dry mix to water and carbonating the resulting solution.

BACKGROUND OF THE PRIOR ART

The market for carbonated beverages has increased at a dramatic rate, and today is a multibillion dollar industry. Up to the present, this market has been served almost exclusively by beverages which are pre-carbonated to the proper level for immediate consumption and then packaged in bottles or cans. While carbonation of beverages at the point of consumption, such as soda fountains, has been practiced for years, prepartion of point-of-consumption individual servings of carbonated beverages in the home has not thus far been greeted with wide acceptance.

One method of making carbonated beverages in the home involves the dilution of flavor syrups to the proper concentration and carbonating the resulting solution, such as would be done at a soda fountain. However, such an approach is overly burdensome for the volume of carbonated beverages consumed in a home, involves the procurement, and correct dilution of, the flavor syrups, and hence has not met with wide popularity. Another method of making carbonated beverages in the home involves the use of dry mixes containing flavors and sugars along with a gas generation system. This type of drink has also not gained wide consumer acceptance since consumers find that the flavor of carbonated beverages produced from mixes does not equal, in both intensity and quality, the flavor of pre-carbonated and bottled beverages.

In order to obtain a beverage having a flavor which consumers regard as "typical" for that type of a drink, it is necessary to incorporate all flavor components, including flavor components present in only small amounts, into the flavor base or concentrate. It has been found that even a relatively small difference in beverage flavor from that considered typical for a particular beverage will not be accepted by consumers.

The flavor of carbonated beverages is developed in part through proper acidulation which points up, or complements, the associated flavor. One of the acids commonly employed for flavor development is phosphoric acid which has found wide use in the more heavy leaf, root, nut, or herbal flavors. Some of the more common types of carbonated beverages utilizing phosphoric acid are colas, root beers, and sarsaparillas.

It is known that part of the unique cola flavor is due to the interaction between the phosphoric acid and other flavor components during an aging period of the liquid flavor base. The phosphoric acid must be mixed with the other flavor components because it cannot be dehydrated separately in the manufacture of a dry beverage mix due to its extreme hygroscopicity. Substitutions of other readily dehydratable acids for the phosphoric acid may be made, but this results in flavor changes in beverages, such as colas, which depend upon their phosphoric acid content as an essential component of their flavor.

Thus, in order to prepare dry instant mixed for flavored beverages which contain phosphoric acid as a flavor component and acidulent, it is necessary to include the phosphoric acid in the liquid flavor base, but also ultimately provide it in a dry, nonreactive form so as to insure stability of the dry mix during handling and storage before use.

Another disadvantage of dry beverages mixes is the relatively slow dissolution rate of the sugars (usually sucrose) in the mix. As can be appreciated by all who labor, any extra preparation time and effort is extremely disadvantageous to the tired, thirsty consumer who turns to a carbonated beverage as a readily accessible and convenient item of cold, liquid refreshment.

U.S. Pat. No. 3,966,994 to Kennedy, June 6, 1976, filed July 14, 1974, discloses the use of dihydrogen monosodium phosphate (MSP) to stabilize phosphoric acid containing dry beverage mixes. U.S. Pat. No. 3,930,053 to Japikse et al., Dec. 30, 1975, also filed on July 14, 1974, followed suit in requiring MSP for preparing relatively non-hygroscopic and stable phosphoric acid containing mixes. However, fructose sweetened dry cola mixes containing MSP made via the Japikse et al, process are too hygroscopic for successful commercial exploitation.

For beverage flavors which contain phosphoric acid, serious problems are presented when attempts are made to dehydrate the beverage flavor base to form a dry mix. This is due to the extreme hygroscopicity and reactivity of phosphoric acid in dry prior art form. If a dry beverage mix is made containing dehydrated phosphoric acid and prior art large sugar granules, the acid is so extremely hygroscopic in such a system that it rehydrates the dry powdered beverage mix and forms a deliquescent, tarry substance after only a short storage time.

BRIEF SUMMARY OF THE INVENTION

An object of the present invention is to form a dry beverage mix utilizing phosphoric acid present in a substantially non-hygroscopic and stable form as a flavoring ingredient and acidulent.

It is also an object of the present invention to form such a dry beverage mix by dehydrating a flavor base which contains all flavor components, including phosphoric acid, contained therein.

It is a further object of the present invention to form a dry beverage mix having an extremely rapid dissolution rate upon contact with water and which requires only a minimum amount of agitation for dissolution in an aqueous solution to form a beverage in a short period of time.

Another object of the present invention is to furnish the consumer with a convenient method for preparing carbonated beverages equal in level and quality of flavor to pre-carbonated, bottled beverages.

Still another object of the present invention is to eliminate the need of a chemical stabilizer like MSP in a dry beverage mix which utilizes phosphoric acid.

The present invention provides a rapidly dissolving non-hygroscopic dry, stable beverage mix for beverage flavor bases containing phosphoric acid as a flavoring component and acidulent. This is surprisingly accomplished by using pulverized sugar instead of granular sugar in the preparation of the dry beverage mix. A liquid flavor base is combined with the pulverized sugar to form a slurry, which slurry is suitably dried and ground into suitable particle sizes. Upon subsequent contact with water, the particles rapidly dissolve with a minimum of agitation to form a beverage having a full-bodied flavor typical of that beverage, including the flavor component contributed by phosphoric acid, without any undesirable off-flavors.

DETAILED DESCRIPTION OF THE INVENTION

This invention provides a rapidly dissolving non-hygroscopic dry beverage mix comprising a uniform fine crystalline matrix of: (a) from about 90 wt.% to about 99 wt.% of pulverized crystalline sugar, and from about 1 wt.% to about 10 wt.% of a flavorant and acidulent. Preferably, said flavorant and acidulent is a cola base material containing phosphoric acid. A liquid flavor base is admixed with pulverized crystalline sugar in an amount such that said admixture has a flavor base:-sugar ratio of about 0.01 to about 0.15 and wherein said slurry has a total solids content of from about 75 wt.% to about 95 wt.%. The slurry admixture is suitably dried and ground to discrete dry beverage mix particles. A preferred total solids concentration of the slurry is from about 90 to about 95 wt.%.

The flavor concentrate, commonly called the flavor base (as used herein the term "flavor base" includes phosphoric acid as a part thereof), is the beverage component containing all flavorings, with the exception of sugar (as used herein, the term "sugar" covers not only sucrose, the sugar most commonly used in the production of carbonated beverages, but also fructose (Levulose).). A carbonated beverage is obtained by diluting the flavor base to the proper strength for a particular beverage, adding the proper sugar content for that beverage and carbonating this aqueous solution, Formulations for various flavor bases are well known to those skilled in the art and may readily be obtained from published sources. For example, Merory, *Food Flavorings*, The Avi Publishing Company, (1960), lists various flavor base formulations in Chapter 17, entitled "Syrup and Soda Flavorings"; also, in Jacobs, M. B., *Manufacture and Analysis of Carbonated Beverages*, Chemical Publishing Company (1959), formulations for many fruit and non-fruit flavor bases are given. Complete flavor bases are also commercially available in standardized concentrations for ease in dilution to the proper concentration for the final beverage. These are commonly known as "2-ounce" or "¼-ounce" flavor bases depending upon the amount of the base which must be added to a gallon of simple syrup which is then diluted with water to the final beverage strength. (As those skilled in the art will appreciate, a simple syrup is a solution of sugar in water, usually in a standard concentration). Commercially obtained flavor bases are typically about 50% solvent, usually water or ethanol, with the flavor components typical for a particular flavor dissolved therein.

In accordance with the present invention, a beverage flavor base containing phosphoric acid is added to finely-powdered crystalline sugar. This permits the dehydration by drying of the phosphoric acid component of the flavor base in a stable, non-hygroscopic form and thus permits the flavor base to be formed into a dry instant beverage mix suitable for subsequent dissolution in water to yield a beverage having a fully developed flavor typical for that beverage.

The particle size of the powdered sugar is critical. Although the applicant does not wish to be bound by any one theory, it is possible that the increased surface area provided by the recrystallization of the pulverized crystalline sugar yields a surface phenomenon which acts to stabilize the mix by effectively entrapping and neutralizing the hygroscopic tendencies of phosphoric acid in a uniform fine crystalline matrix. The particle size of the sugar must be small enough to provide an effectively large surface area upon recrystallization-agglomeration-drying. Recrystallization is enhanced with "seed" crystals. Conversely, prior art granular crystalline sugar starting materials which particle sizes are too large, are theorized to allow minute droplets of phosphoric acid to exist in a coarse sugar matrix upon recrystallization-agglomeration-drying. Hygroscopicity of dry coarse sugar matrix results. Pulverized crystalline sugar is therefore critical to the practice of the present invention. "Pulverized" as used herein is intended to mean "finely powdered". A preferred pulverized fructose sugar has a particles range of from about 1 to about 100 microns.

If a commercially available beverage flavor base is used for the preparation of the dry beverage mix of the present invention, various substances may optionally be added to the flavor base in processing it in accordance with the present invention to provide a dry beverage mix. The only criterion that limits the possible inclusion of any optional ingredient is that it must be acceptable for use in an edible food product. Other than this restriction, only the appearance of an undesirable off-taste or off-color for a particular beverage will place a practical limitation on the addition of any desired material. As those skilled in the art will appreciate, the variety of different materials which may be added is extremely broad indeed. For example, the present invention is concerned with a dry beverage mix which will be dissolved in water at the point of consumption. In doing this, the consumer will most likely use tap water which is slightly alkaline due to the mineral salts dissolved therein. Thus, to neutralize this additional alkalinity, additional acid may be needed to achieve the same intensity of acidulation as that achieved when distilled or de-ionized water is used as a beverage base. Any common food acid, such as citric, malic, or phosphoric may be used for this purpose. Other materials which may be used include various additional flavoring ingredients which may be added to the commercial flavor base to modify its flavor, accentuate any especially preferred flavor notes, or replace any flavor notes which may be volatilized and lost during processing into a dry mix. Some of the more common flavoring ingredients which can be added to a cola beverage include, for example, extract of coca leaves, neroli oil, lime oil, lemon oil, orange oil, nutmeg oil, vanilla extract or cassia oil. Other flavoring materials for colas or any other desired beverage may be found in published formulation recipes for the particular beverage flavor desired. Other types of materials, such as food colorings, for example, U.S. Certified Food Colors or caramel coloring; stimulants, for example, caffeine; artificial sweeteners, for example, saccharin; bodying agents, for example, sorbitol or sodium carboxymethylcellulose; forming agents, for example, licorice root extract or saponin-bearing extract of soaproot; or preservatives, for example, sodium benzoate, propylene glycol or ascorbic acid may advantageously be added to the flavor base to achieve the respective desired results. Stabilizers for cola, e.g. monosodium phosphate, may also be added to the flavor base. Alternatively, if the flavor base is formulated specifically for processing into a dry beverage mix in accordance with the present invention, standard flavor base formulations may be directly adapted for use by the addition of any desired optional ingredient not set forth in the standard formulation.

In forming the dry beverage flavor particles, the proper flavor base is blended with finely powdered sugar to form a thick, homogenous slurry. In this regard, it is often necessary to add a small amount of water for workability and to achieve thorough admixing of the ingredients. Only so much water as is necessary for these purposes need to be added since any added water is subsequently removed during the drying operation and excess water only contributes to the inefficiency of the process. It has been found that any type of conventional mixing means may be used for this purpose, as long as a thorough mixing is achieved. It is preferred, however, that the temperature of the slurry be kept below about 100° F. during admixture to avoid any loss of volatiles or heat degradation of flavor components. With this consideration in mind, it is thus recommended that low-shear mixing means be employed, since these will impart less energy to the mixture, and correspondingly, less heat.

The admixture of flavor base, the powdered beverage sugar, and any optional ingredients is then dried to a substantial dryness using conventional vacuum or freeze drying techniques to produce a dry beverage mix. Substantial dryness is that state where the matter has the appearance of a free-flowing, dry-to-the-touch solid. This will typically mean drying to a final moisture content of less than about 1%, and preferably, less than about 0.5%. In keeping with the present invention, it is important that the slurry be dried by vacuum drying, or equivalent techniques which causes the drying material to foam, so as to form a beverage mix which is rapidly dissolvable in water requiring only a minimum amount of agitation. Vacuum drying techniques are known to those skilled in the art and will not be detailed herein for purposes of brevity. It has been found that best results are obtained if the slurry is dried within a period of about twenty-four hours and that the temperature of the slurry is not raised about 100° F., and preferably above 50° F., during the drying process. In the practice of the present invention, it has been found that conventional freeze drying techniques are equivalent to the vacuum drying techniques in the results obtained and may thus be advantageously employed. Freeze drying basically involves freezing to temperatures of about −10° F. to about −40° F. and removing the water by sublimation as the frozen slurry is gradually warmed under vacuum conditions. Again, any of the conventional freeze-drying techniques known to those skilled in the art are suitable for the practice of the present invention.

The dried product resulting from the dehydration step is ground by conventional size reduction techniques so as to make it more readily dissolvable when added to water and to enhance the appearance of the final product. Depending upon the fineness to which the particles are ground, they may be screened to obtain groups of approximately uniform particle size.

After grinding to a suitable particle size, the dry stable beverage mix particles are packaged in suitable aliquot portions for subsequent dissolution in a predetermined amount of water to obtain flavorful beverage ready for carbonation and consumption. The dry beverage particles of the present invention may be advantageously employed with a variety of carbonation systems to provide suitably carbonated, flavorful beverages. For instance, the dry beverage particles as disclosed herein can be added to pre-carbonated water, or, the dry beverage particles can be combined with an economical point-of-consumption carbonation system and this combination then added to tap water to provide a convenient, carbonated beverage. Examples of suitable sources of pre-carbonated water are the use of bottled pre-carbonated water, commonly known as "club soda" or the use of pressure carbonators which utilize $CO_2$-charged cylinders to carbonate water as it is dispensed, such as is done at a soda fountain. Examples of point-of-consumption systems which utilize regular tap water for the beverage include the use of a "chemical couple" such as those disclosed in Mitchell et al., U.S. Pat. No. 3,241,977, issued Mar. 22, 1966, or Hovey, U.S. Pat. No. 3,492,671, issued Jan. 27, 1970; or the use of $CO_2$-loaded zeolite molecular sieves, such as that disclosed in U.S. Pat. No. 3,966,994, issued June 6, 1976, and incorporated herein by reference in its entirety.

The latter-named carbonation system, i.e., the use of $CO_2$-loaded zeolite molecular sieves, is especially preferred in the practice of the present invention.

It is important that the dry flavor particles of the present invention be packaged in a moisture-proof container, in that the particles are hygroscopic in nature and that the particle physical structure collapses when wetted. Also, exposure to moisture would activate any phosphoric acid present in the flavor mix which would lead to degradation of the sugar and flavor components in the mix. A convenient method for insuring that these flavor particles are not degraded by exposure to moisture during storage periods is to have them packaged in the presence of a desiccant. The $CO_2$-loaded molecular sieves disclosed in the above-mentioned U.S. Pat. No. 3,966,994 is a suitable desiccant for such purposes. Thus, the presence of such $CO_2$-loaded zeolite molecular sieves in combination with the dry flavor mix has multiple advantages in that they provide protection of the flavor particles during storage, provide a convenient and sufficient carbonation system during use, and the effervescent action resulting from the molecular sieves immersed in water is sufficient to provide adequate agitation for the dissolution of the dry flavor particles of the instant invention.

The following Examples serve to illustrate or highlight various embodiments of the invention and are not intended to limit the invention in any way.

EXAMPLE I

Crystalline fructose was pulverized to a powder using an Alpine ® pin mill. To 91.0 parts of this pulverized fructose, 2.3 parts of cola flavoring 0.7 parts of 75% phosphoric acid and 6.0 parts of water were added. The resultant slurry containing 92.7% solids by weight was mixed to a uniform consistency in a Hobart mixer. The slurry was spread evenly on drying pans at a loading of 2.8 pounds per square inch and vacuum dried for 24 hours at about 200 microns absolute pressure. The resultant stable dry cake was ground using a Fitzmill comminutor. Flavor particles passing through a U.S. Standard Number 6 sieve and held on a U.S. Standard Number 18 sieve were retained. During this work-up time, the product was exposed to the atmosphere for about two hours with no visible signs of moisture pickup. The product comprised a substantially iniform crystalline matrix of about 97.2 wt.% pulverized crystalline sugar and about 2.8 wt.% of flavorant and acidulent on a dry weight basis.

Approximately 183 milliliters of 65° F. water and 105 grams of 0° F. ice were placed in a glass already containing 19.3 grams of flavor particles and a $CO_2$-loaded zeolite molecular sieve (U.S. Pat. No. 3,888,998). The molecular sieve carbonated the beverage to 1.3 chitticks after 2 minutes and 1.6 chitticks after 4 minutes. At four minutes, 98% of the dry cola mix had dissolved as measured by the Zeiss refractometer. No stirring was supplied during this preparation.

The dry cola mix was stored at room temperature in a plastic cup with lid for two weeks and remained flowable and showed no sign of moisture pickup.

EXAMPLE II

To 91.0 parts of granular crystalline fructose, 2.3 parts of cola flavoring, 0.7 parts of 75% phosphoric acid, and about 6.0 parts of water, were added; the same as in Example I except that particle size of the sugars used. The slurry was vacuum dried for about 24 hours, the same as Example I. The resultant cake, however, was too hygroscopic to handle.

EXAMPLE III

A powdered cola beverage was prepared as in Example II. The formulation was changed, however, to include monosodium phosphate (MSP). More importantly, the granular crystalline fructose sweetener was not pulverized prior to processing. The fructose was used as received from Roche Chemical Division of Hoffmann-LaRoche, Inc.

A slurry formulation was 90.0 parts granular crystalline fructose, 0.7 parts phosphoric acid, 0.7 parts monosodium phosphate, 2.6 parts cola flavorant and 6.0 parts water.

The resultant vacuum-dried cake was somewhat better than the one of Example II, but also could not be handled and ground in the ambient due to its hygroscopicity. When exposed to the atmosphere, the vacuum-dried cake became spongy and ultimately deliquesced. This product would require processing in a special dry, inert gas environment, adding a substantial cost premium to the process and product.

EXAMPLE IV

A powdered cola beverage was prepared as in Example III, except that the pulverized crystalline fructose was used instead of the granular.

The resultant vacuum-dried cake was ground and the dry beverage mix was as non-hygroscopic as the product of Example I.

Table I

| Example | Sugar Particle Size | Solubility | Hygroscopicity |
| --- | --- | --- | --- |
| I | 1–100 microns | Excellent | non-hygro. |
| II | granular | Could not be measured | very hygroscopic |
| III | granular | Could not be measured | hygroscopic |
| IV | 1–100 microns | Excellent | non-hygro. |

The products of the four mixes of Examples I–IV are compared in Table I to highlight the beneficent effect the pulverized crystalline fructose sugar has on the stability of the dried $H_3PO_4$ acidulated beverage mixes as contrasted with regular coarse granulated sugar.

What is claimed is:

1. A rapidly dissolving, stability improved dry beverage mix comprising a uniform crystalline matrix of:
   (a) from about 90 wt. % to about 99 wt. % of pulverized crystalline sugar, and
   (b) from about 1 wt. % to about 10 wt. % of a flavor base containing a flavorant and phosphoric acid acidulent on a dry weight basis; and
   wherein said pulverized crystalline sugar originally had a particle size of from about 1 to about 100 microns, and wherein said stability improved dry beverage mix made with said pulverized crystalline sugar is improved in structural stability, dissolves rapidly and is substantially non-hygroscopic as compared to dry beverage mixes made with larger particle sized crystalline sugars and said phosphoric acid acidulent.

2. The rapidly dissolving dry beverage mix of claim 1 wherein said flavorant and acidulent is a cola base material.

3. The dry beverage mix of claim 1 wherein said crystalline sugar is selected from the group consisting of fructose and sucrose.

4. The dry beverage mix of claim 1 wherein said mix has a moisture content of less than 1%.

5. The dry beverage mix of claim 1 wherein said mix has a moisture content of less than 0.5%.

6. A process for preparing a dry stable, substantially non-hygroscopic, rapidly dissolving crystalline sugar-sweetened dry beverage mix comprising the steps of:
   (a) pulverizing said crystalline sugar to a particle size of from about 1 to about 100 microns;
   (b) forming a slurry by admixing a flavor base containing a flavorant and a phosphoric acid acidulent with said pulverized sugar in an amount such that said admixture has a flavor base:sugar ratio of about 0.01 to about 0.15 and wherein said slurry has a total solids content of from about 75 wt.% to about 95 wt. %;
   (c) drying said slurry admixture to substantial dryness; and
   (d) grinding the dried mixture to form discrete dry beverage mix particles.

7. The process of claim 6 wherein said slurry admixture is vacuum dried.

8. The process of claim 6 wherein the total solids concentration of said slurry is from about 90 wt.% to about 95 wt.%.

9. The process of claim 6 wherein said admixture is dried to a final moisture content of less than about 1%.

10. The process of claim 6 wherein said admixture is dried to a final moisture content of less than about 0.5%.

11. The product prepared by the process of claim 6.

12. The rapidly dissolving dry beverage mix of claim 6 wherein said flavor base is a cola base material.

13. The dry beverage mix of claim 6 wherein said crystalline sugar is selected from the group consisting of fructose and sucrose.

14. The sugar of claim 13 wherein said sugar is fructose.

15. A rapidly dissolving, stability improved dry beverage mix comprising a uniform crystalline matrix of:
   (a) from about 90 wt. % to about 99 wt. % pulverized crystalline fructose, and
   (b) from about 1 wt. % to about 10 wt. % of a flavorant and phosphoric acid acidulent on a dry weight basis, and
   wherein said pulverized crystalline fructose originally had a particle size of from about 1 to about 100 microns; and wherein said improved dry beverage mix made with said pulverized crystalline fructose is improved in structural stability, dissolves rapidly and is substantially non-hygroscopic as compared to dry beverage mixes made with unpulverized granular crystalline fructose and said phosphoric acid acidulent.

16. The rapidly dissolving stability improved dry beverage mix of claim 15 wherein said dry beverage mix is a dry cola base mix.

* * * * *